United States Patent
Lee et al.

(10) Patent No.: US 12,081,044 B2
(45) Date of Patent: Sep. 3, 2024

(54) WIRELESS POWER TRANSMITTER, WIRELESS POWER RECEIVER, AND METHOD OF OPERATING THE SAME

(71) Applicant: SAMSUNG ELECTRONICS CO., LTD., Suwon-si (KR)

(72) Inventors: Sangwook Lee, Suwon-si (KR); Sungbum Park, Suwon-si (KR); Kyungmin Lee, Suwon-si (KR); Bohwan Choi, Suwon-si (KR); Jinsoo Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 31 days.

(21) Appl. No.: 18/099,029

(22) Filed: Jan. 19, 2023

(65) Prior Publication Data
US 2023/0261529 A1    Aug. 17, 2023

Related U.S. Application Data

(63) Continuation of application No. PCT/KR2023/000887, filed on Jan. 18, 2023.

(30) Foreign Application Priority Data

Jan. 19, 2022    (KR) .................. 10-2022-0008080

(51) Int. Cl.
*H02J 50/80*    (2016.01)
*H02J 50/12*    (2016.01)

(52) U.S. Cl.
CPC .............. *H02J 50/80* (2016.02); *H02J 50/12* (2016.02)

(58) Field of Classification Search
CPC .................................. H02J 50/80; H02J 50/12
See application file for complete search history.

(56) References Cited

U.S. PATENT DOCUMENTS

2013/0058380 A1    3/2013  Kim et al.
2014/0158680 A1    6/2014  Kitaizumi et al.
(Continued)

FOREIGN PATENT DOCUMENTS

EP          4152563         3/2023
JP       WO2013-094174      6/2013
(Continued)

OTHER PUBLICATIONS

Search Report and Written Opinion dated May 2, 2023 issued in International Patent Application No. PCT/KR2023/000887.

*Primary Examiner* — Daniel Cavallari
(74) *Attorney, Agent, or Firm* — Nixon & Vanderhye, P.C.

(57) ABSTRACT

According to embodiments, a wireless power transmitter may include: a communication module comprising communication circuitry; a power transmission circuit configured to transmit wireless power; and a processor. The processor may be configured to: establish a communication connection with a wireless power receiver using the communication module, control the communication module to transmit information about a first period to the wireless power receiver via the communication connection, control the power transmission circuit to transmit first power of a first frequency and a first magnitude to an outside, control the communication module to receive information about a second frequency of second power received at the wireless power receiver from the wireless power receiver via the communication connection, control the communication module to release the communication connection, based on the first frequency being different from the second frequency, and control the power transmission circuit to transmit third power of a magnitude different from the first magnitude of the first power to the outside during the first period, based on the first frequency (Continued)

corresponding to or substantially identical to the second frequency.

20 Claims, 8 Drawing Sheets

(56) References Cited

U.S. PATENT DOCUMENTS

| | | |
|---|---|---|
| 2015/0022013 A1 | 1/2015 | Kim et al. |
| 2015/0194814 A1 | 7/2015 | Taylor et al. |
| 2016/0049826 A1 | 2/2016 | Lee et al. |
| 2016/0190873 A1 | 6/2016 | Baarman et al. |
| 2017/0237296 A1 | 8/2017 | Keith et al. |
| 2017/0353054 A1 | 12/2017 | Lee |
| 2018/0205268 A1 | 7/2018 | Park |
| 2020/0084842 A1* | 3/2020 | Yoshino ............... H02J 50/40 |
| 2021/0159730 A1* | 5/2021 | Moon ................... H04B 5/72 |
| 2021/0249913 A1 | 8/2021 | Ha et al. |

FOREIGN PATENT DOCUMENTS

| | | |
|---|---|---|
| KR | 10-2015-0011274 | 1/2015 |
| KR | 10-2016-0020372 | 2/2016 |
| KR | 10-2016-0059395 | 5/2016 |
| KR | 10-2021-0099178 | 8/2021 |
| KR | 10-2021-0101525 | 8/2021 |
| KR | 10-2023-0055796 | 4/2023 |
| WO | 2017/007163 | 1/2017 |
| WO | 2021/105283 | 6/2021 |
| WO | 2021/230703 | 11/2021 |

\* cited by examiner

WIRELESS POWER TRANSMITTER, WIRELESS POWER RECEIVER, AND METHOD OF OPERATING THE SAME

CROSS-REFERENCE TO RELATED APPLICATIONS

This application is a PCT-Bypass Continuation of International Application No. PCT/KR2023/000887 designating the United States, filed on Jan. 18, 2023, in the Korean Intellectual Property Receiving Office and claiming priority to Korean Patent Application No. 10-2022-0008080, filed on Jan. 19, 2022, in the Korean Intellectual Property Office, the disclosures of which are incorporated by referenced herein in their entireties.

BACKGROUND

Field

The disclosure relates to a wireless power transmitter, a wireless power receiver, and a method of operating the same.

Description of Related Art

The Wireless Power Consortium has recently established a wireless power standard for kitchen appliances (Ki Cordless Kitchen (hereafter, Ki standard)), and a global standard induction system conforming to the Ki standard senses or recognizes a target object based on wireless communication and supplies power to the target object.

The induction system may communicate with an external electronic device. A current induction system may communicate with an external electronic device by wireless communication. However, when a wireless power transmitter of the induction system performs communication with the external electronic device by wireless communication, it is necessary to identify whether the external electronic device which has established a communication connection is located on a power transmission coil of the wireless power transmitter. Establishment of a communication connection with an external electronic device which is not located on the power transmission coil of the wireless power transmitter may be called cross-connection. When the wireless power transmitter is cross-connected to the external electronic device, the wireless power transmitter may transmit power to the outside even though the external electronic device does not exist on the power transmission coil of the wireless power transmitter, thereby causing power waste. Transmission of power to another electronic device disposed on the power transmission coil of the wireless power transmitter may result in an unexpected problem.

Accordingly, there is a demand for developing an induction system that detects an object existing on a wireless power transmitter and determines whether the object is a power transmission target.

SUMMARY

Embodiments of the disclosure provide a wireless power transmitter, a wireless power receiver, and a method of operating the same that may determine whether to maintain a communication connection between the wireless power transmitter and the wireless power receiver based on a result of comparing the frequency of transmitted power with the frequency of received power, a result of comparing a period during which power is transmitted with a period during which power is received, and a load value comparison result.

According to various example embodiments, a wireless power transmitter may include: a communication module comprising communication circuitry; a power transmission circuit configured to transmit wireless power; and a processor. The processor may be configured to: establish a communication connection with a wireless power receiver using the communication module, control the communication module to transmit information about a first period to the wireless power receiver via the communication connection, control the power transmission circuit to transmit first power of a first frequency and a first magnitude to an outside, control the communication module to receive information about a second frequency of second power received at the wireless power receiver from the wireless power receiver via the communication connection, control the communication module to release the communication connection based on the first frequency being different from the second frequency, and control the power transmission circuit to transmit third power of a magnitude different from the first magnitude of the first power to the outside during the first period based on the first frequency being identical to the second frequency.

According to various example embodiments, a method of operating a wireless power transmitter may include: establishing a communication connection with a wireless power receiver using a communication module of the wireless power transmitter; transmitting information about a first period to the wireless power receiver via the communication connection; transmitting first power of a first frequency and a first magnitude to an outside through a power transmission circuit of the wireless power transmitter; receiving information about a second frequency of second power received at the wireless power receiver from the wireless power receiver via the communication connection; based on the first frequency being different from the second frequency, releasing the communication connection; and based on the first frequency being identical to the second frequency, transmitting third power of a magnitude different from the first magnitude of the first power to the outside during the first period through the power transmission circuit.

According to various example embodiments, a wireless power receiver may include: a communication module comprising communication circuitry; a power reception circuit configured to receive wireless power; and a processor. The processor may be configured to: establish a communication connection with a wireless power transmitter using the communication module, control the communication module to receive information about a first period from the wireless power transmitter via the communication connection, identify a first frequency and a first magnitude of first power identified at at least one point of the power reception circuit, control the communication module to transmit information about the first frequency of the received first power to the wireless power transmitter via the communication connection, identify a second magnitude of second power identified at the at least one point of the power reception circuit, the second magnitude being different from the first magnitude of the first power, identify a second period during which the second power is received, control the communication module to release the communication connection based on the first period being different from the second period, and control the communication module to maintain the communication connection based on the first period being identical to the second period.

A wireless power transmitter, a wireless power receiver, and a method of operating the same according to various example embodiments may determine whether to maintain a communication connection between the wireless power transmitter and the wireless power receiver based on a result of comparing the frequency of transmitted power with the frequency of received power, a result of comparing a period during which power is transmitted with a period during which power is received, and a load value comparison result.

Accordingly, cross-connection between the wireless power transmitter and the wireless power receiver may be prevented and/or reduced.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Figure 1A:
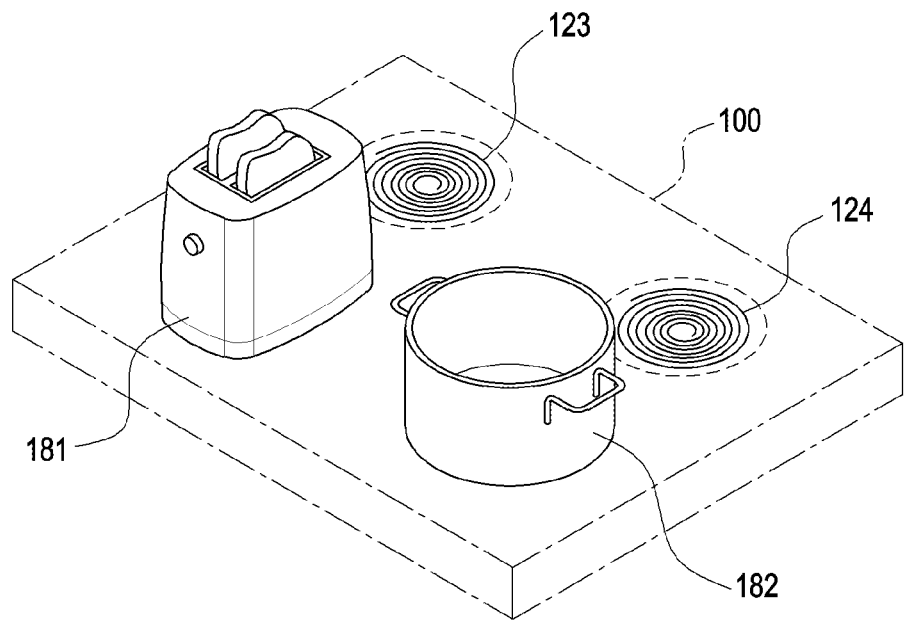
FIG. 1A is a diagram illustrating an example environment in which a wireless power transmitter and a wireless power receiver are used.
Figure 1B:
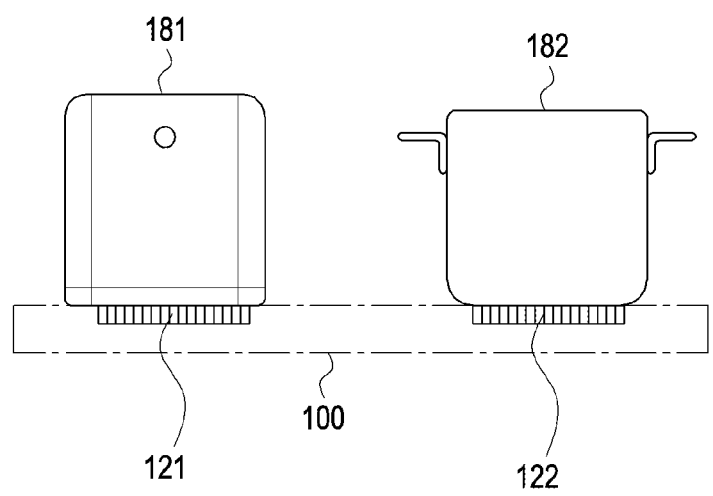
FIG. 1B is a diagram illustrating an example environment in which a wireless power transmitter and a wireless power receiver are used.

FIGS. 1A and 1B are diagrams illustrating an example environment in which a wireless power transmitter and a wireless power receiver are used according to embodiments.

Referring to FIGS. 1A and 1B, according to an embodiment, a wireless power transmission system may include a wireless power transmitter 100. Although the type of the wireless power transmitter 100 is not limited, the wireless power transmitter 100 performing the function of an induction cooktop will be described by way of example, for convenience of description. The wireless power transmitter 100 may include a plurality of coils 121, 122, 123, and 124 corresponding to positions at which a wireless power receiver 181 or a cooking vessel 182 may be located. While FIG. 1A illustrates a total of four coils including the two coils 123 and 124, the coil 121 corresponding to the position of the wireless power receiver 181, and the coil 122 corresponding to the position of the cooking vessel 182, the number of coils included in the wireless power transmitter 100 is not limited. The plurality of coils 121, 122, 123, and 124 may be located under the surface of the wireless power transmitter 100 on which the wireless power receiver 181 or the cooking vessel 182 may be mounted, not on the surface of the wireless power transmitter 100. Accordingly, when the cooking vessel 182 is placed on the wireless power transmitter 100, the cooking vessel 182 may not come into contact with the coil 122.

According to an embodiment, the cooking vessel 182 may be located at a position on the surface of the wireless power transmitter 100 corresponding to the position of the coil 122. The cooking vessel 182 may be a container that accommodates food while the food is being heated. The cooking vessel 182 may be, for example, a pot, a pan, a wok, a skillet, or a kettle, and the type thereof is not limited. The cooking vessel 182 may include a magnetic material that may be heated by the wireless power transmitter 100.

According to an embodiment, the wireless power transmitter 100 may apply a current (e.g., an alternating current (AC)) with a magnitude varying over time to the coils 121, 122, 123, and 124. As the current is applied to the coils 121, 122, 123, and 124, a magnetic field may be formed around the coils 121, 122, 123, and 124. As the current applied to the coils 121, 122, 123, and 124 changes, the magnetic field formed around the coils 121, 122, 123, and 124 may also change. An eddy current based on a change in the magnetic field may flow on the surface of the cooking vessel 182 in contact with the wireless power transmitter 100 and heat the cooking vessel 182. A process of heating the cooking vessel 182 by the eddy current flowing on the surface of the cooking vessel 182 may be expressed as wireless power reception of the cooking vessel 182. For example, the wireless power transmitter 100 may generate power (e.g., a magnetic field) for heating the cooking vessel 182 based on a mode selection (or reception of a user input) for heating the cooking vessel 182.

In addition, the wireless power transmitter 100 may transmit power according to a resonance method or an induction method. The wireless power transmitter 100 may be configured to perform wireless power transmission based on either of the resonance method or the induction method. The wireless power transmitter 100 may be configured to support both the resonance method and the induction method. The wireless power transmitter 100 may apply a current (e.g., AC) to the coils 121, 122, 123, and 124 according to the resonance method and/or the induction method. A process of generating an induced magnetic field through a coil by the wireless power transmitter 100 may be expressed as wireless power transmission of the wireless power transmitter 100. In the case of the resonance method, the wireless power transmitter 100 may include, for example, a power source, a direct current (DC)-AC conversion circuit, an amplifier circuit, an impedance matching circuit, at least one capacitor, at least one coil, an out-band communication circuit (e.g., a Bluetooth low energy (BLE) communication circuit), and so on. The at least one capacitor and the at least one coil may form a resonant circuit. The wireless power transmitter 100 may be implemented in a manner defined by, for example, the air fuel alliance (AFA) standard (or the alliance for wireless power (A4WP) standard). When the wireless power transmitter 100 operates in the induction method, the wireless power transmitter 100 may include, for example, a power source, a DC-AC conversion circuit, an amplifier circuit, an impedance matching circuit, at least one capacitor, at least one coil, a communication modulation/demodulation circuit, and so on. The wireless power transmitter 100 may be implemented in a manner defined by the wireless power consortium (WPC) standard (e.g., the Qi standard or the Ki standard).

According to an embodiment, the wireless power receiver 181 may be located on the surface of the wireless power transmitter 100 corresponding to the position of the coil 121 and perform wireless charging. The wireless power receiver 181 may include a coil that generates an induced electromotive force by a magnetic field with a magnitude varying over time formed around the coil. A process of outputting an AC current from the coil or applying an AC voltage to the coil as the induced electromotive force is generated in the coil of the wireless power receiver 181 may be expressed as wireless power reception of the wireless power receiver 181. The wireless power receiver 181 may process (e.g., rectify and convert (or regulate)) power from the included coil and transmit the processed power to a component (e.g., a battery or a charger for charging the battery) of the wireless power receiver 181. The wireless power receiver 181 may not include a battery, and the power from the coil may be used to operate components included in the wireless power receiver 181. The wireless power receiver 181 may be, for example, an electric kettle, a toaster, or a blender. In addition, the wireless power receiver 181 may be a mobile device, and the type thereof is not limited.

According to an embodiment, the wireless power transmitter 100 may communicate with the wireless power receiver 181. For example, the wireless power transmitter 100 may communicate with the wireless power receiver 181 according to an out-band scheme. The wireless power transmitter 100 or the wireless power receiver 181 may transmit and receive data, using a communication circuit (e.g., a BLE communication module, a near field communication (NFC) module, a wireless fidelity (Wi-Fi) module, or a Wi-gig module) provided separately from the coil or a patch antenna. The wireless power transmitter 100 may transmit media data, and according to implementation, each of a plurality of different communication circuits (e.g., the BLE communication module, NFC module, Wi-Fi module, and Wi-gig module) may transmit media data and a wireless power transmission/reception control signal, respectively. For example, the wireless power transmitter 100 may communicate with the wireless power receiver 181 according to an in-band scheme. The wireless power transmitter 100 or the wireless power receiver 181 may change the load (or impedance) of data to be transmitted, for example, according to an on/off keying modulation scheme. The wireless power transmitter 100 or the wireless power receiver 181 may determine data transmitted from the other party by measuring a load change (or impedance change) based on a change in the magnitude of the current, voltage, or power of the coil.

Figure 2:
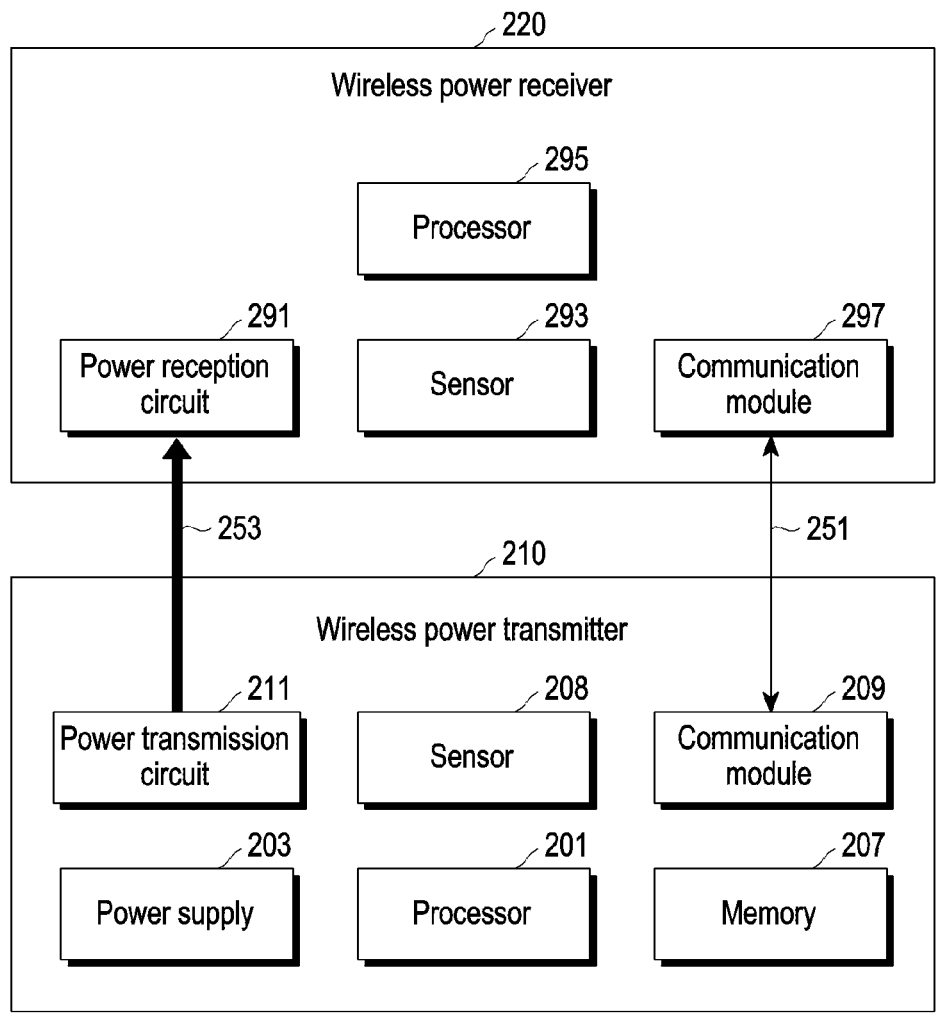
FIG. 2 is a block diagram illustrating an example configuration of a wireless power transmitter and a wireless power receiver included in a wireless power transmission system according to an embodiment.

FIG. 2 is a block diagram illustrating an example configuration of a wireless power transmitter and a wireless power receiver included in a wireless power transmission system according to an embodiment.

Referring to FIG. 2, the wireless power transmission system may include a wireless power transmitter 210. The wireless power transmission system may include a wireless power receiver 220 that wirelessly receives power from the wireless power transmitter 210. The wireless power transmitter 210 may be the wireless power transmitter 100 of FIG. 1A. The wireless power receiver 220 may be the wireless power receiver 181 of FIG. 1A.

According to an embodiment, the wireless power transmitter 210 may include a processor (e.g., including processing circuitry) 201, a power supply 203, memory 207, a sensor 208, a communication module (e.g., including communication circuitry) 209, and/or a power transmission circuit 211.

According to an embodiment, the power supply 203 may supply DC power to the power transmission circuit 211. Providing DC power may be understood as at least one of application of a DC voltage or application of a DC current. The power supply 203 may receive power from at least one of a DC power source or an AC power source and output DC power. The power supply 203 may be controlled by the processor 201, and the processor 201 may control the power supply 203 to supply power to the power transmission circuit 211 based on a set output level.

According to an embodiment, the power transmission circuit 211 may include an inverter and a power transmission coil (e.g., 121, 122, 123, or 124 of FIGS. 1A and 1B). The power transmission circuit 211 may output AC power using the DC power received from the power supply 203. Output of AC power may be understood as at least one of application of an AC voltage or application of an AC current. The inverter of the power transmission circuit 211 may supply AC power to a power transmission coil of the power transmission circuit 211. The inverter of the power transmission circuit 211 may be controlled by the processor 201, and the processor 201 may control the inverter to supply power to the power transmission coil based on a set output level. The inverter may control at least one of the width, duty cycle, or power level of an output pulse. Alternatively, the processor 201 may control the output level of the power supply 203.

According to an embodiment, the power transmission coil of the power transmission circuit 211 may wirelessly transmit power 253 to the outside, using the AC power received from the inverter of the power transmission circuit 211. The wireless power transmission to the outside may be understood as a process of generating an induced magnetic field from the power transmission coil by applying a current to the power transmission coil in the wireless power transmitter 210.

According to an embodiment, the sensor 208 may sense at least one of a voltage, a current, power, or an impedance applied to the power transmission coil of the power transmission circuit 211. The sensor 208 may measure a load change (or impedance change) based on a change in the magnitude of the current, voltage, or power of the power transmission coil of the power transmission circuit 211.

According to an embodiment, the processor 201 may be implemented as, but not limited to, a microprocessor or a micro controlling unit (MCU), or may be implemented as a field programmable gate array (FPGA) or a set of analog devices. The processor 201 may transmit an electrical signal to or receive an electrical signal from another component of the wireless power transmitter 210. In the disclosure, when it is said that the wireless power transmitter 210 or the processor 201 performs any operation through another component of the wireless power transmitter 210, this may imply that the processor 201 transmits an electrical signal for obtaining the result of the operation to another component or receives an electrical signal generated as a result of performing the operation from another component.

According to an embodiment, the memory 207 may load commands or data received from another component (e.g., the sensor 208 or the communication module 209) and store result data, by the processor 201.

According to an embodiment, the communication module 209 may include various communication circuitry and perform various communications with other entities. The communication module 209 may be controlled by the processor 201 and perform communication 251 with a communication module 297 of the wireless power receiver 220 according to the out-band scheme. For example, the processor 201 may receive a communication signal (e.g., an advertisement signal) for advertising the wireless power receiver 220, using the communication module 209.

While not shown in FIG. 2, according to an embodiment, the wireless power transmitter 210 may further include an input device for receiving a command or data from the outside (e.g., the user) of the wireless power transmitter 210. For example, the input device may include at least one of a keyboard for receiving a specific temperature input, a button for setting an output level, or a touch input device.

While not shown in FIG. 2, according to an embodiment, the wireless power transmitter 210 may further include an oscillator. For example, the oscillator may generate a clock signal. The oscillator may provide the generated clock signal to the processor 201. The processor 201 may control the inverter to apply power to the power transmission coil, using the clock signal provided from the oscillator.

According to an embodiment, the wireless power receiver 220 may include a processor (e.g., including processing circuitry) 295, the communication module (e.g., including communication circuitry) 297, a power reception circuit 291, and a sensor 293.

According to an embodiment, the power reception circuit 291 may receive wireless power 253 from the power transmission circuit 211 of the wireless power transmitter 210. For example, based on the wireless power receiver 220 being disposed at a position corresponding to the power transmission coil included in the power transmission circuit 211 of the wireless power transmitter 210, the power reception circuit 291 may receive wireless power 253 from the power transmission circuit 211. Based on the wireless power receiver 220 not being disposed at the position corresponding to the power transmission coil of the wireless power transmitter 210, the power reception circuit 291 may not receive the wireless power 253 from the power transmission circuit 211. For example, when the value of the wireless power 253 received from the power transmission circuit 211 by the power reception circuit 291 is less than or equal to a preset value, the power reception circuit 291 may understand that it has not received the wireless power 253 from the power transmission circuit 211.

According to an embodiment, the wireless power receiver 220 may process power from a power reception coil included in the power reception circuit 291 and transmit the processed power to other components of the wireless power receiver 220. For example, the wireless power receiver 220 (e.g., the power reception circuit 291) may include a rectifier and/or a DC-DC converter. The wireless power receiver 220 may include a power management integrated circuit (PMIC) (not shown).

According to an embodiment, the sensor 293 may sense at least one of a voltage, a current, power, or an impedance identified at at least one point of the power reception circuit 291. The sensor 293 may measure a load change (or impedance change) based on a change in the current, voltage, or power of the power reception coil of the power reception circuit 291. For example, the processor 295 may use the sensor 293 to identify at least one of a voltage, a current,
power, or a load (e.g., impedance) at at least one point of the power reception circuit 291 (e.g., an output terminal of the power reception coil of the power reception circuit 291 or an output terminal of a rectifier of the power reception circuit 291). For example, the processor 295 may use the sensor 293 to identify the frequency and/or magnitude of power (or voltage and current) identified at the at least one point of the power reception circuit 291.

According to an embodiment, the processor 295 of the wireless power receiver 220 may be understood as similar to the processor 201 of the wireless power transmitter 210, and the description of the processor 295 may be replaced by the description of the processor 201.

According to an embodiment, the communication module 297 may include various communication circuitry and perform various communications with other entities. The communication module 297 may be controlled by the processor 295 and perform the communication 251 with the communication module 209 of the wireless power transmitter 210 according to the out-band scheme. The wireless power receiver 220 may receive power for communication from the wireless power transmitter 210, use the power to wake up the processor 295 and/or the communication module 297, and broadcast a communication signal (e.g., an advertisement signal) for advertising, using the communication module 297. The communication module 209 of the wireless power transmitter 210 may receive the broadcast communication signal from the communication module 297 of the wireless power receiver 220.

Figure 3:
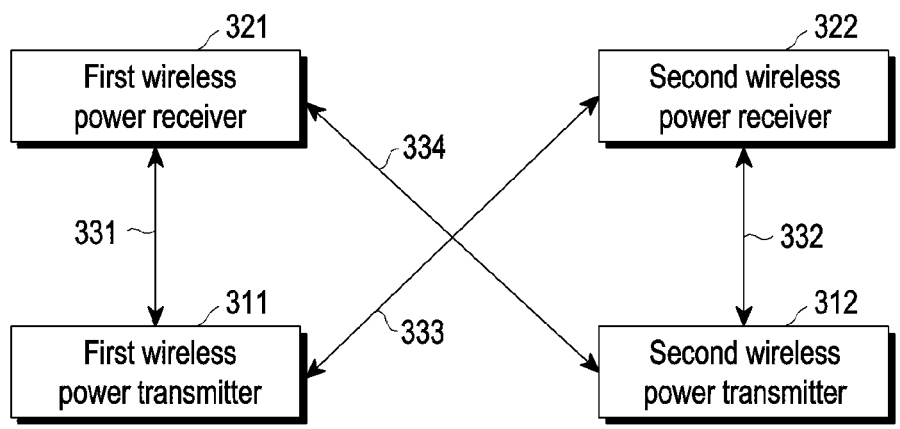
FIG. 3 is a diagram illustrating example communication connection relationships between wireless power transmitters and wireless power receivers included in a wireless power transmission system according to an embodiment.

FIG. 3 is a diagram illustrating example communication connection relationships between wireless power transmitters and wireless power receivers included in a wireless power transmission system according to an embodiment.

Referring to FIG. 3, according to an embodiment, the wireless power transmission system may include at least one wireless power transmitter (e.g., a first wireless power transmitter 311 and/or a second wireless power transmitter 312), and at least one wireless power receiver (e.g., a first wireless power receiver 321 and/or a second wireless power receiver 322).

In FIG. 3, the first wireless power receiver 321 may be disposed at a position corresponding to a power transmission coil of the first wireless power transmitter 311. The first wireless power receiver 321 and the first wireless power transmitter 311 may establish a communication connection 331. The establishment of the communication connection 331 between the first wireless power transmitter 311 and the first wireless power receiver 321 disposed at the position corresponding to the power transmission coil of the first wireless power transmitter 311 may be expressed as establishment of the normal communication connection 331 between the first wireless power transmitter 311 and the first wireless power receiver 321. Similarly, establishment of a communication connection 332 between the second wireless power transmitter 312 and the second wireless power receiver 322 disposed at a position corresponding to a power transmission coil of the second wireless power transmitter 312 may be expressed as establishment of the normal communication connection 332 between the second wireless power transmitter 312 and the second wireless power receiver 322.

In FIG. 3, the first wireless power receiver 321 may not be disposed at the position corresponding to the power transmission coil of the second wireless power transmitter 312. The first wireless power receiver 321 and the second wireless power transmitter 312 may establish a communication connection 334. The establishment of the communication connection 334 between the second wireless power transmitter 312 and the first wireless power receiver 321 not disposed at the position corresponding to the power transmission coil of the second wireless power transmitter 312 may be expressed as establishment of the abnormal communication connection 334 between the second wireless power transmitter 312 and the first wireless power receiver 321. An abnormal communication connection may be referred to as a "cross-connection". The second wireless power transmitter 312 and the first wireless power receiver 321 may be cross-connected. Similarly, establishment of a communication connection 333 between the first wireless power transmitter 311 and the second wireless power receiver 322 not disposed at the position corresponding to the power transmission coil of the first wireless power transmitter 311 may be expressed as establishment of the abnormal communication connection 333 between the first wireless power transmitter 311 and the second wireless power receiver 322. The first wireless power transmitter 311 and the second wireless power receiver 322 may be cross-connected.

Figure 4:
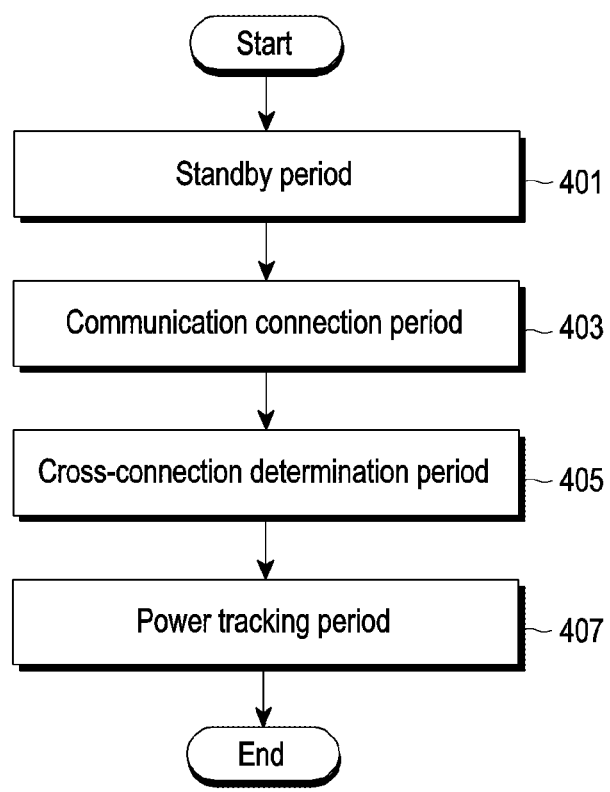
FIG. 4 is a flowchart illustrating an example method of operating a wireless power transmitter and a wireless power receiver included in a wireless power transmission system according to an embodiment.

FIG. 4 is a flowchart illustrating an example method of operating a wireless power transmitter and a wireless power receiver included in a wireless power transmission system according to an embodiment. FIG. 4 will be described with reference to FIG. 2.

Referring to FIG. 4, a period during which each of the wireless power transmitter 210 and the wireless power receiver 220 performs an operation may include a standby period 401, a communication connection period 403, a cross-connection determination period 405, and a power tracking period 407. The standby period 401 may be a period during which the wireless power transmitter 210 and/or the wireless power receiver 220 maintains a low power state. The communication connection period 403 may be a period during which the wireless power transmitter 210 and the wireless power receiver 220 establish a communication connection. The cross-connection determination period 405 may be a period during which the wireless power transmitter 210 and the wireless power receiver 220 determine whether they are in a normal communication connection state or an abnormal communication connection state (e.g., a cross-connection state). The power tracking period 407 may be a period during which based on the wireless power transmitter 210 and the wireless power receiver 220 being in the normal communication connection state, the wireless power transmitter 210 wirelessly transmits power to the wireless power receiver 220. For example, based on the wireless power transmitter 210 and the wireless power receiver 220 being in the abnormal communication connection state (e.g., the cross-connection state), the wireless power transmitter 210 and the wireless power receiver 220 may not enter the power tracking period 407.

According to an embodiment, in the standby period 401, the wireless power transmitter 210 (e.g., the processor 201) may transmit detection power or driving power to the wireless power receiver 220. The detection power may be power for detecting an external device. For example, the wireless power transmitter 210 may detect an external device (e.g., the wireless power receiver 220) based on a load change identified while transmitting the detection power. For example, the wireless power transmitter 210 may determine that the external device (e.g., the wireless power receiver 220) is located on the wireless power transmitter 210 based on the detection power. The driving power may be power for driving a component of the external device. For example, the wireless power transmitter 210 may transmit the driving power based on the detection of the external device (e.g., the wireless power receiver 220) or periodically. The wireless power receiver 220 may drive a component of the wireless power receiver 220 based on driving power transmitted from an external device (e.g., the wireless power transmitter 210). For example, the wireless power receiver 220 may wake up the processor 295 and/or the communication module 297 based on the received driving power.

According to an embodiment, in the communication connection period 403, the wireless power receiver 220 (e.g., the processor 295) may broadcast a communication signal (e.g., an advertisement signal) for advertising, using the communication module 297. The communication module 209 of the wireless power transmitter 210 may receive the communication signal broadcast from the communication module 297 of the wireless power receiver 220. The wireless power transmitter 210 and the wireless power receiver 220 may establish a communication connection based on the broadcast communication signal. The type of the communication connection between the wireless power transmitter 210 and the wireless power receiver 220 is not limited.

According to an embodiment, in the cross-connection determination period 405, the wireless power transmitter 210 and the wireless power receiver 220 may determine whether they are cross-connected. For example, the wireless power transmitter 210 or the wireless power receiver 220 may identify a frequency, a "timeset", and/or a load (e.g., impedance) to determine whether the wireless power transmitter 210 and the wireless power receiver 220 are cross-connected. A step or operation of determining whether the wireless power transmitter 210 and the wireless power receiver 220 are cross-connected based on a frequency may be referred to as Decision 1 (or d1). A step or operation of determining whether the wireless power transmitter 210 and the wireless power receiver 220 are cross-connected based on a "timeset" may be referred to as Decision 2 (or d2). A step or operation of determining whether the wireless power transmitter 210 and the wireless power receiver 220 are cross-connected based on a load (e.g., impedance) may be referred to as Decision 3 (or d3).

Decision 1 may include determining whether a frequency (e.g., a first frequency) of power transmitted by the wireless power transmitter 210 is identical to a frequency (e.g., a second frequency) of power received by the wireless power receiver 220.

Decision 2 may include determining whether a period during which the wireless power transmitter 210 transmits power (e.g., first power) is identical to a period during which the wireless power receiver 220 receives the power (e.g., the first power). The period during which the wireless power transmitter 210 transmits power (e.g., the first power) or the period during which the wireless power receiver 220 receives the power (e.g., the first power) may be referred to as a "timeset". For example, in the case where the wireless power transmitter 210 has transmitted power (e.g., the first power) for 10 ms, the timeset of the power (e.g., the first power) transmitted by the wireless power transmitter 210 may be 10 ms. For example, when the period during which the wireless power transmitter 210 transmits the power (e.g., the first power) and the period during which the wireless power receiver 220 receives the power (e.g., the first power) are equally 10 ms, it may be said that the timeset of the power (e.g., the first power) transmitted by the wireless power transmitter 210 and the timeset of the power (e.g., the first power) received by the wireless power receiver 220 are identical to each other.

Decision 3 may include determining whether a load identified by the wireless power transmitter 210 is identical to a load identified by the wireless power receiver 220. A load may be an impedance, and a method of identifying a load by the wireless power transmitter 210 or the wireless power receiver 220 is not limited. Decision 3 may include determining whether a load identified by the wireless power transmitter 210 is identical to a load related to the wireless power receiver 220. Decision 3 may include determining whether a load identified by the wireless power transmitter 210 is included in a load range related to the wireless power receiver 220. Alternatively, Decision 3 may be a step of determining whether a load identified by the wireless power transmitter 210 is 0.

According to an embodiment, Decision 1, Decision 2, and Decision 3 may be sequentially performed, and the operation sequence of Decision 1, Decision 2, and Decision 3 is not limited. At least one of Decision 1, Decision 2, or Decision 3 may be omitted.

Each period (e.g., the waiting period 401, the communication connection period 403, the cross-connection determination period 405, and/or the power tracking period 407) of FIG. 4 will be described in greater detail below with reference to FIG. 5.

Figure 5:
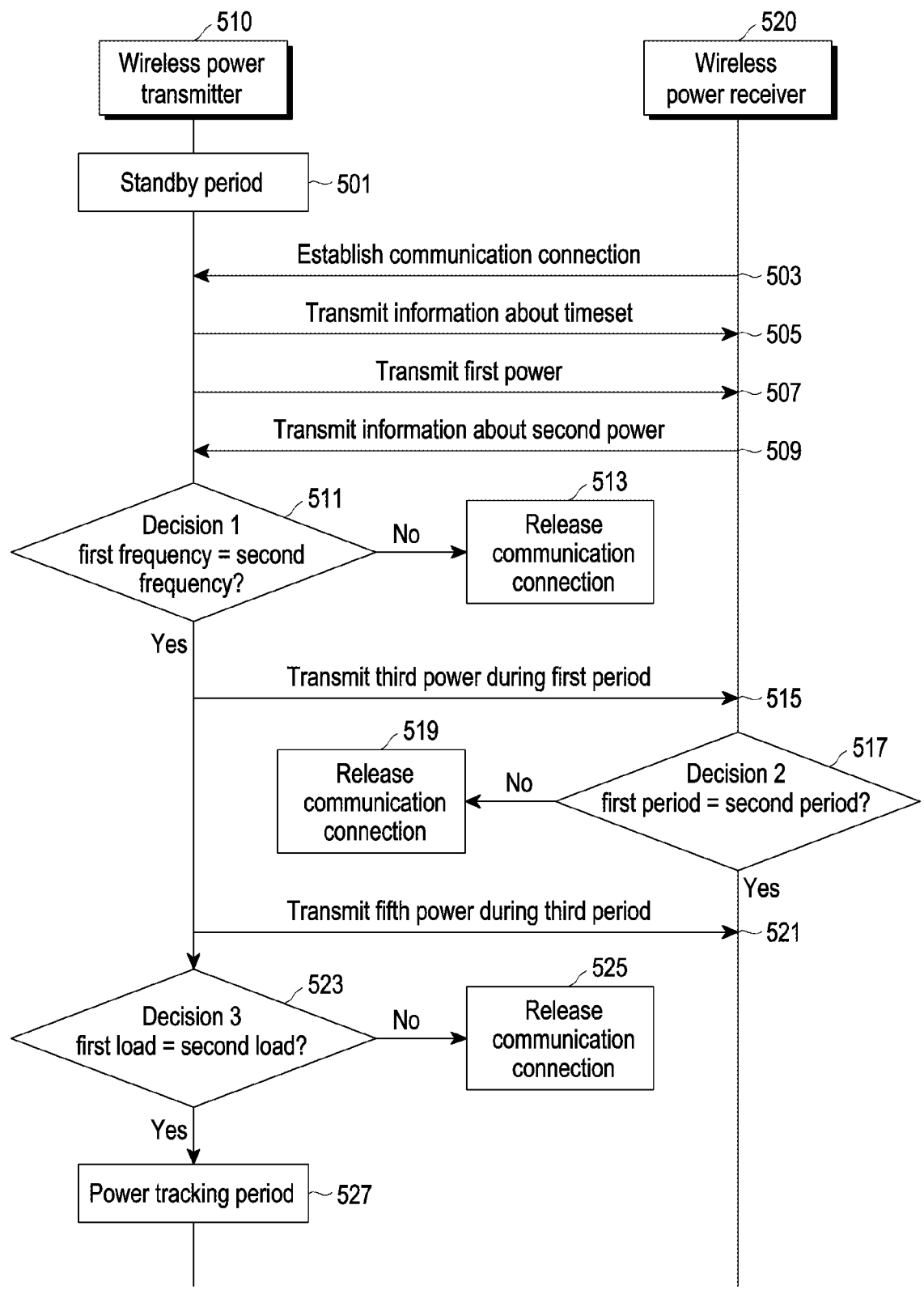
FIG. 5 is a flowchart illustrating an example method of operating a wireless power transmitter and a wireless power receiver included in a wireless power transmission system according to an embodiment.
Figure 6:
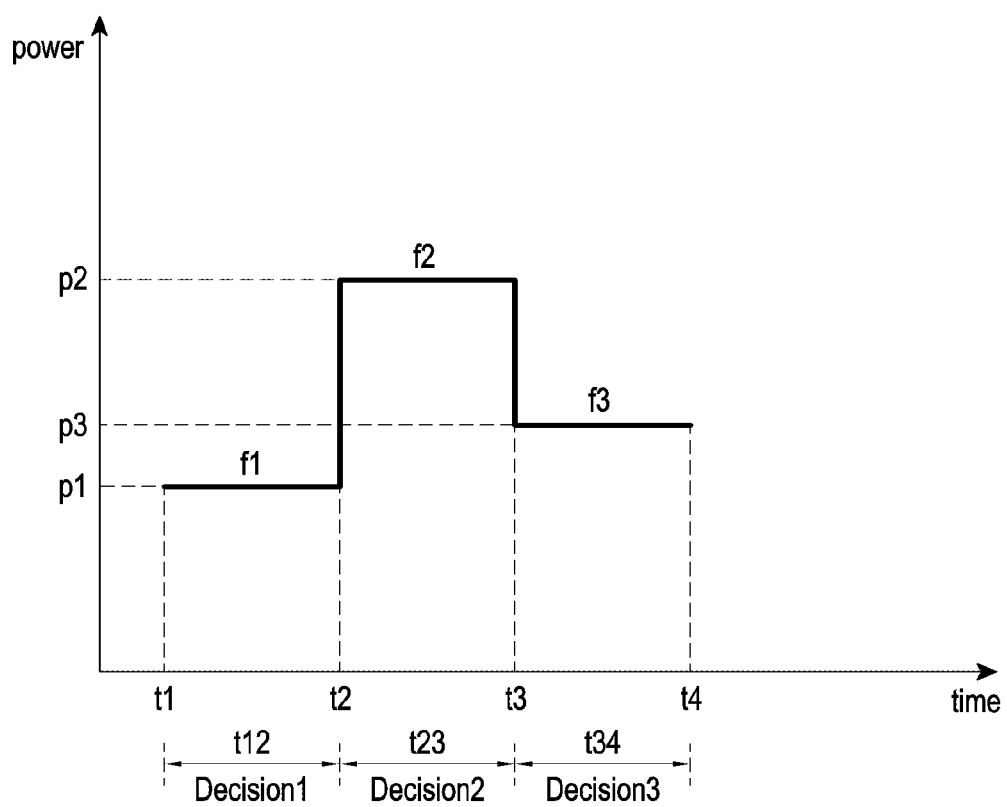
FIG. 6 is a diagram illustrating an example method of operating a wireless power transmitter and a wireless power receiver included in a wireless power transmission system according to an embodiment.

FIG. 5 is a flowchart illustrating an example method of operating a wireless power transmitter and a wireless power receiver included in a wireless power transmission system according to an embodiment. FIG. 5 will be described with reference to FIGS. 2 and 6. FIG. 6 is a diagram for describing example operations of a wireless power transmitter and a wireless power receiver included in a wireless power transmission system according to an embodiment.

A wireless power transmitter 510 of FIG. 5 may be the wireless power transmitter 210 of FIG. 2. A wireless power receiver 520 of FIG. 5 may be the wireless power receiver 220 of FIG. 2.

FIG. 6 is a diagram illustrating power transmitted from the wireless power transmitter 510 of FIG. 5 to the wireless power receiver 520 over time during the cross-connection determination period (e.g., operation 405 in FIG. 4 or operations 505 to 525 in FIG. 5).

Referring to FIG. 5, according to an embodiment, the wireless power transmitter 510 (e.g., the processor 201) may be in the standby period (e.g., the standby period 401 of FIG. 4) in operation 501. According to an embodiment, the standby period of operation 501 may be omitted.

In operation 503, according to an embodiment, the wireless power transmitter 510 (e.g., the processor 201) and the wireless power receiver 520 (e.g., the processor 295) may establish a communication connection. The wireless power transmitter 510 may establish the communication connection with the wireless power receiver 520, using the communication module 209. The wireless power receiver 520 may establish the communication connection with the wireless power transmitter 510, using the communication module 297. The communication connection between the wireless power transmitter 510 and the wireless power receiver 520 may be a normal communication connection or an abnormal communication connection (a cross-connection).

In operation 505, according to an embodiment, the wireless power transmitter 510 may transmit information about a timeset (e.g., information about a first period) (e.g., information about t23 of FIG. 6). The wireless power transmitter 510 may control the communication module 209 to transmit the information about the timeset (e.g., the information about the first period) (e.g., the information about t23 of FIG. 6) to the wireless power receiver 520 via the communication connection. The wireless power receiver 520 may control the communication module 297 to receive the information about the timeset (e.g., the information about the first period) (e.g., the information about t23 of FIG. 6) from the wireless power transmitter 520 via the communication connection. The information about the timeset (e.g., the information about the first period) (e.g., the information about t23 of FIG. 6) may be information about a period during which power to be transmitted from the wireless power transmitter 510 is transmitted. For example, the wireless power transmitter 510 may arbitrarily (or randomly) determine the timeset (e.g., the first period) (e.g., t23). For example, the wireless power transmitter 510 may determine the timeset (e.g., the first period) (e.g., t23 of FIG. 6) and transmit information about the timeset (e.g., the information about the first period) (e.g., the information about t23 of FIG. 6). For example, the wireless power transmitter 510 may determine one of a plurality of periods within a first period range as a timeset (e.g., the first period) (e.g., t23 in FIG. 6). For example, the first period range may be set to a range shorter than a specified period. The information about the timeset (e.g., the information about the first period) (e.g., the information about t23 of FIG. 6) will be described later with reference to FIG. 6.

In operation 507, according to an embodiment, the wireless power transmitter 510 may transmit power to the outside (e.g., the wireless power receiver 520 or another wireless power receiver). For example, the wireless power transmitter 510 may control the power transmission circuit 211 to transmit first power of a first frequency (e.g., f1 of FIG. 6) and/or a first magnitude (e.g., p1 of FIG. 6). For example, the wireless power transmitter 210 may arbitrarily (or randomly) determine the frequency for the power to be transmitted, and transmit the power at the determined frequency in operation 507. For example, the wireless power transmitter 510 may determine one of a plurality of frequencies within a first frequency range as the first frequency (e.g., f1 of FIG. 6) of the first power in operation 507. For example, the first frequency range may be set to a range higher than the frequency (e.g., f2 of FIG. 6) of third power in operation 515 to be described in greater detail below and lower than a specified frequency. The first frequency (e.g., f1 of FIG. 6) and the first magnitude (e.g., p1 of FIG. 6) of the first power transmitted from the wireless power transmitter 510 will be described in greater detail below with reference to FIG. 6. In operation 507, according to an embodiment, the wireless power receiver 520 may receive power from the outside (e.g., the wireless power transmitter 510 or another wireless power transmitter). The power (e.g., second power) received by the wireless power receiver 520 may correspond to the power (e.g., the first power) transmitted from the wireless power transmitter 510 or power transmitted from another wireless power transmitter. The wireless power receiver 520 may identify a second frequency and/or a second magnitude of the second power identified at at least one point of the power reception circuit 291 (e.g., the output terminal of the power reception coil of the power reception circuit 291 or the output terminal of the rectifier of the power reception circuit 291).

According to an embodiment, operation 507 may be performed after operation 505, or operation 505 may be performed after operation 507.

In operation 509, according to an embodiment, the wireless power receiver 520 may transmit information about the power (e.g., information about the second frequency and/or the second magnitude of the second power) identified at the at least one point of the power reception circuit 291 (e.g., the output terminal of the power reception coil of the power reception circuit 291 or the output terminal of the rectifier of the power reception circuit 291) through the communication module 197. The wireless power transmitter 510 may receive the information about the second power (e.g., the information about the second frequency and/or the second magnitude of the second power) received at the wireless power receiver 520 from the wireless power receiver 520 through the communication module 209.

In operation 511, according to an embodiment, the wireless power transmitter 510 may determine whether it is cross-connected to the wireless power receiver 520 (Decision 1). The wireless power transmitter 510 may determine whether it is cross-connected to the wireless power receiver 520, based on a result of a comparison between the first frequency of the first power transmitted in operation 507 and the second frequency of the second power identified in operation 509. The wireless power transmitter 510 may determine whether to maintain the communication connection with the wireless power receiver 520 based on whether it is cross-connected to the wireless power receiver 520.

In operation 513, according to an embodiment, the wireless power transmitter 510 may control the communication module 209 to release the communication connection from the wireless power receiver 520, based on the first frequency of the first power transmitted in operation 507 being different from the second frequency of the second power identified in operation 509.

In operation 515, according to an embodiment, the wireless power transmitter 510 may control the power transmission circuit 211 to transmit third power of a magnitude (e.g., p2 of FIG. 6) different from the magnitude (e.g., p1 of FIG. 6) of the first power transmitted in operation 507 to the outside during the first period (e.g., t23 of FIG. 6) determined in operation 505, based on the first frequency of the first power transmitted in operation 507 being identical to the second frequency of the second power identified in operation 509. For example, the wireless power transmitter 510 may control the power transmission circuit 211 to transmit the third power by adjusting the third power to have a frequency (e.g., f2 of FIG. 6) different from the frequency (e.g., f1 of FIG. 6) of the first power of operation 507 in operation 515. The frequency (e.g., f2 of FIG. 6) and magnitude (e.g., p2 of FIG. 6) of the third power transmitted by the wireless power transmitter 510 in operation 515 will be described in greater detail below with reference to FIG. 6. In operation 515, according to an embodiment, the wireless power receiver 520 may receive power from the outside (e.g., the wireless power transmitter 510 or another wireless power transmitter). The power (e.g., fourth power) received by the wireless power receiver 520 in operation 515 may correspond to the power (e.g., the third power) transmitted from the wireless power transmitter 510 or power transmitted from another wireless power transmitter. The wireless power receiver 520 may identify a reception period (e.g., a second period) of the power (e.g., the fourth power) identified at at least one point of the power reception circuit 291 (e.g., the output terminal of the power reception coil of the power receiver circuit 291 or the output terminal of the rectifier of the power reception circuit 291). For example, the wireless power receiver 520 may identify the magnitude (e.g., a fourth magnitude) of the power (e.g., the fourth power) identified at the at least one point of the power reception circuit 291 (e.g., the output terminal of the power reception coil of the power receiver circuit 291 or the output terminal of the rectifier of the power reception circuit 291), wherein the magnitude of the power is different from the magnitude (e.g., the second magnitude) of the power (e.g., the second power) received in operation 507. For example, the wireless power receiver 520 may identify the reception period (e.g., the second period) of the power (e.g., the fourth power) by sensing a change in the power received through the power reception circuit 291, using the sensor 293.

In operation 517, according to an embodiment, the wireless power receiver 520 may determine whether it is cross-connected to the wireless power transmitter 510 (Decision 2). The wireless power receiver 520 may determine whether it is cross-connected to the wireless power transmitter 510, based on a result of comparing the timeset (e.g., the first period) identified based on the information received from the wireless power transmitter 510 in operation 505 with the reception period (e.g., the second period) of the power (e.g., the fourth power) identified in operation 515. The wireless power receiver 520 may determine whether to maintain the communication connection with the wireless power transmitter 510 based on whether it is cross-connected to the wireless power transmitter 510.

In operation 519, according to an embodiment, the wireless power receiver 520 may control the communication module 297 to release the communication connection from the wireless power transmitter 510 based on the timeset (e.g., the first period) identified based on the information received from the wireless power transmitter 510 in operation 505 being different from the reception period (e.g., the second period) of the power (e.g., the fourth power) identified in operation 515. According to an embodiment, the wireless power receiver 520 may control the communication module 297 to maintain the communication connection with the wireless power transmitter 510 based on the timeset (e.g., the first period) identified based on the information received from the wireless power transmitter 510 in operation 505 being identical to the reception period (e.g., the second period) of the power (e.g., the fourth power) identified in operation 515.

In operation 521, according to an embodiment, the wireless power transmitter 510 may control the power transmission circuit 211 to transmit fifth power of a magnitude (e.g., p3 of FIG. 6) different from the magnitude (e.g., p2 of FIG. 6) of the third power transmitted in operation 515 to the outside (e.g., to the wireless power receiver 520 or to another wireless power receiver) during a third period (e.g., t34 of FIG. 6), based on the communication connection to the wireless power receiver 520 being maintained during the transmission of the third power (e.g., during the first period) (e.g., during t23 of FIG. 6) in operation 515. The frequency (e.g., f3 of FIG. 6) and magnitude (e.g., p3 of FIG. 6) of the fifth power transmitted from the wireless power transmitter 510 in operation 521 will be described in greater detail below with reference to FIG. 6. In operation 521, according to an embodiment, the wireless power receiver 520 may receive power from the outside (e.g., the wireless power transmitter 510 or another wireless power transmitter). In operation 521, the power (e.g., sixth power) received by the wireless power receiver 520 may correspond to the power (e.g., the fifth power) transmitted from the wireless power transmitter 510 or power transmitted from another wireless power transmitter. According to an embodiment, the wireless power receiver 520 may control the communication module 297 to transmit information about a load value (e.g., a first load value) related to the wireless power receiver 520 or a load range (e.g., a first load range) related to the wireless power receiver 520 to the wireless power transmitter 510 via the communication connection. The load value (e.g., the first load value) related to the wireless power receiver 520 or the load range (e.g., the first load range) related to the wireless power receiver 520 may be a load value or a load range measured by the wireless power receiver 520. The wireless power transmitter 510 may control the communication module 209 to receive the information about the load value (e.g., the first load value) related to the wireless power receiver 520 or the load range (e.g., the first load range) related to the wireless power receiver 520 from the wireless power receiver 520 via the communication connection, and identify the load value (e.g., the first load value) related to the wireless power receiver 520 or the load range (e.g., the first load range) related to the wireless power receiver 520 based on the received information.

In operation 523, according to an embodiment, the wireless power transmitter 510 may determine whether it is cross-connected to the wireless power receiver 520 during the transmission period (e.g., the third period) of the power (e.g., the fifth power) in operation 521 (Decision 3). The wireless power transmitter 510 may determine whether it is cross-connected to the wireless power receiver 520 based on a load value (e.g., a second load value) measured through the power transmission circuit 211 during the transmission period (e.g., the third period) of the power (e.g., the fifth power) in operation 521. For example, the wireless power transmitter 510 may determine that it is cross-connected to the wireless power receiver 520 based on the load value (e.g., the second load value) measured through the power transmission circuit 211 during the transmission period (e.g., the third period) of the power (e.g., the fifth power) in operation 521 being a specified value (e.g., 0 (zero)). The wireless power transmitter 510 may determine that it is not cross-connected to the wireless power receiver 520 based on the load value (e.g., the second load value) measured through the power transmission circuit 211 during the transmission period (e.g., the third period) of the power (e.g., the fifth power) in the operation 521 belonging to a specified range (e.g., a range exceeding 0 (zero)). For example, the wireless power transmitter 510 may determine that it is not cross-connected to the wireless power receiver 520 based on the load value (e.g., the second load value) measured through the power transmission circuit 211 during the transmission period (e.g., the third period) of the power (e.g., the fifth power) in the operation 521 corresponding to the load value (e.g., the first load value) related to the wireless power receiver 520 or belonging to the load range (e.g., the first load range) related to the wireless power receiver 520. The wireless power transmitter 510 may determine that it is cross-connected to the wireless power receiver 520 based on the load value (e.g., the second load value) measured through the power transmission circuit 211 during the transmission period (e.g., the third period) of the power (e.g., the fifth power) in the operation 521 not corresponding to the load value (e.g., the first load value) related to the wireless power receiver 520 or not belonging to the load range (e.g., the first load range) related to the wireless power receiver 520. The wireless power transmitter 510 may determine whether to maintain the communication connection with the wireless power receiver 520 based on whether it is cross-connected to the wireless power receiver 520.

In operation 525, according to an embodiment, the wireless power transmitter 510 may control the communication module 209 to release the communication connection from the wireless power receiver 520 based on determining that the communication connection to the wireless power receiver 520 is a cross-connection in operation 523.

In operation 527, according to an embodiment, the wireless power transmitter 510 may control the communication module 209 to maintain the communication connection with the wireless power receiver 520 based on determining that the communication connection to the wireless power receiver 520 is not a cross-connection in operation 523. The wireless power transmitter 510 may enter the power tracking period (e.g., 407 of FIG. 4) based on maintaining the communication connection with the wireless power receiver 520 during the third period in operation 521.

FIG. 6 is a diagram illustrating power transmitted from the wireless power transmitter 510 to the wireless power receiver 520 over time during the cross-connection determination period (e.g., operations 405 of FIG. 4 or operations 505 to 525 of FIG. 5) according to an embodiment.

With reference to FIG. 6, the frequency and/or magnitude of power transmitted in each operation of FIG. 5 and information transmitted in each operation of FIG. 5 will be described.

In FIG. 6, t1, t2, t3, and t4 may denote time points, t12, t23, and t34 may denote periods, p1, p2, and p3 may denote magnitudes of power, and f1, f2, and f3 may denote frequencies of the power.

According to an embodiment, in FIG. 6, the wireless power transmitter 210 may transmit first power of a first magnitude p1 and a first frequency f1 to the outside in a period of Decision 1 between t1 and t2. For example, the wireless power transmitter 210 may arbitrarily (or randomly) determine a frequency for power to be transmitted and transmit the power at the determined frequency in operation 507. For example, the wireless power transmitter 510 may determine one of a plurality of frequencies belonging to a first frequency range as the first frequency f1 of the first power. For example, the first frequency range may be set to a range higher than the frequency (e.g., f2) of power transmitted in operation 515 of FIG. 5 and lower than a specified frequency.

According to an embodiment, in FIG. 6, the wireless power transmitter 210 may transmit second power of a second magnitude p2 and a second frequency f2 to the outside during a first period t23 in a period of Decision 2 between t2 and t3. For example, the second frequency f2 may be lower than the first frequency f1. The second magnitude p2 may be larger than the first magnitude p1. For example, the wireless power transmitter 510 may determine one of a plurality of periods belonging to the first period range as a timeset (e.g., the first period) (e.g., t23). For example, the first period range may be set to a range shorter than a specified period. For example, the wireless power transmitter 210 may arbitrarily (or randomly) determine the timeset (e.g., the first period) (e.g., t23), transmit information about the timeset (e.g., the first period) (e.g., t23) to the wireless power receiver 520 in operation 505, and transmit the power to the outside during the timeset (e.g., the first period) (e.g., t23) in operation 515. For example, based on maintaining the communication connection with the wireless power receiver 520 during the period t12, the wireless power transmitter 510 may transmit the second power of the second magnitude p2 and the second frequency f2 during the timeset (e.g., the first period) (e.g., t23) to the outside.

According to an embodiment, in FIG. 6, the wireless power transmitter 210 may transmit third power of a third magnitude p3 and a third frequency f3 to the outside during a second period t34 in a period of Decision 3 between t3 and t4. For example, the third frequency f3 may be higher than the second frequency f2. The third magnitude p3 may be smaller than the second magnitude p2. For example, the third frequency f3 may be the same as or different from the first frequency f1. The third magnitude p3 may be the same as or different from the first magnitude p1. For example, after transmitting the second power of the second magnitude p2 and the second frequency f2 to the outside during the first period t23, the wireless power transmitter 210 may transmit the third power of the third magnitude p3 and the third frequency f3 to the outside during the second period t34. For example, the second period t34 may be fixed to a specified value. For example, while the wireless power transmitter 510 may arbitrarily (or randomly) determine the timeset (e.g., the first period) (e.g., t23), the second period t34 may be fixed to a specified value. For example, the wireless power transmitter 510 may transmit the third power of the third magnitude p3 and the third frequency to the outside during the second period t34 based on maintaining the communication connection with the wireless power receiver 520 during the first period t23.

The wireless power receiver 220 according to an embodiment may identify that the wireless power transmitter 210 and the wireless power receiver 220 are in the step of Decision 3 by receiving power during the specified second period t34.

Figure 7:
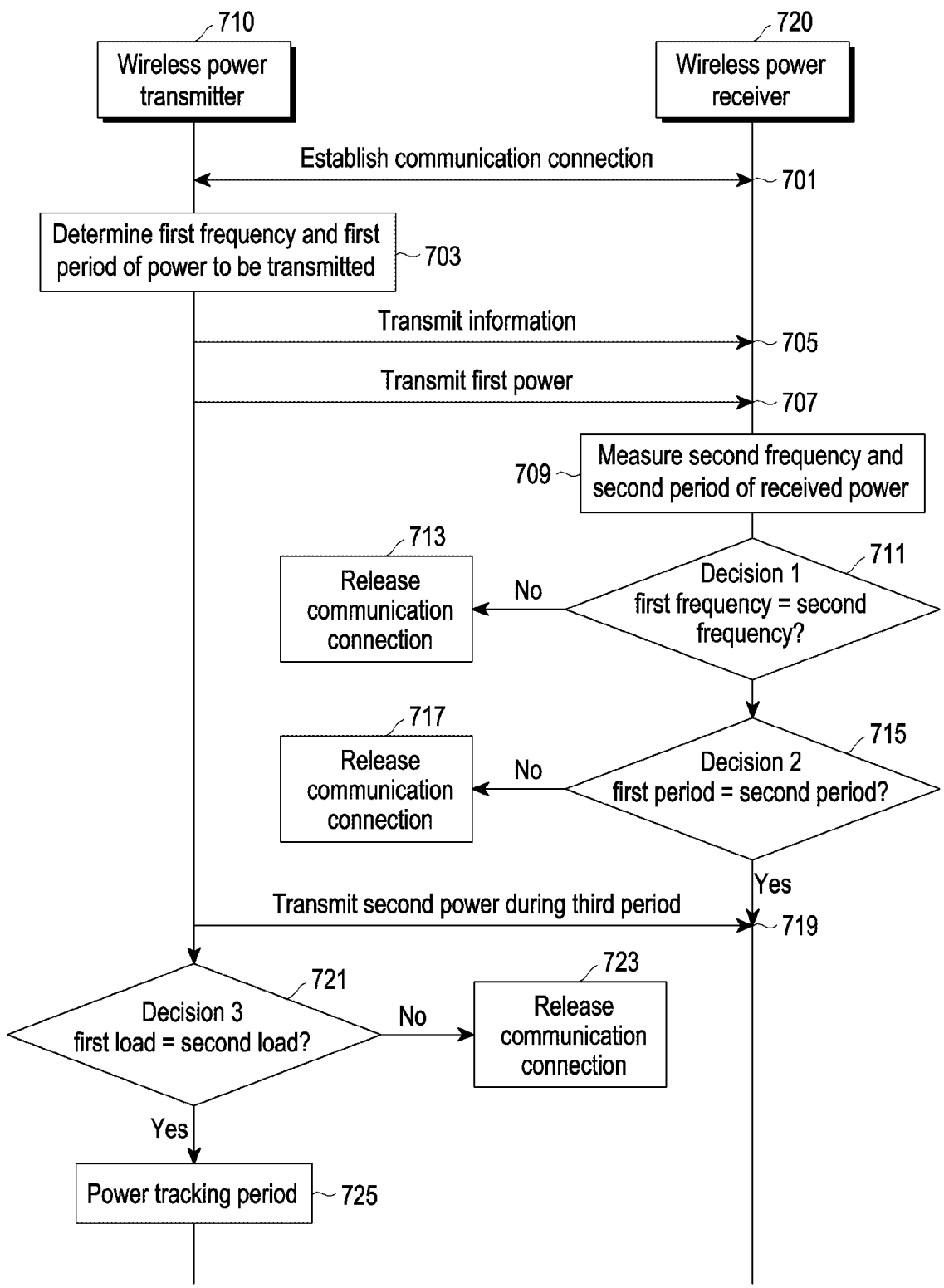
FIG. 7 is a flowchart illustrating an example method of operating a wireless power transmitter and a wireless power receiver included in a wireless power transmission system according to an embodiment.

FIG. 7 is a flowchart illustrating an example method of operating a wireless power transmitter and a wireless power receiver included in a wireless power transmission system according to an embodiment.

The description of FIG. 7 may be understood with reference to FIGS. 5 and 6.

A wireless power transmitter 710 of FIG. 7 may be the wireless power transmitter 210 of FIG. 2. A wireless power receiver 720 of FIG. 7 may be the wireless power receiver 220 of FIG. 2.

Referring to FIG. 7, in operation 701, according to an embodiment, the wireless power transmitter 710 (e.g., the processor 201) and the wireless power receiver 720 (e.g., the processor 295) may establish a communication connection. The wireless power transmitter 710 may establish the communication connection with the wireless power receiver 720, using the communication module 209. The wireless power receiver 720 may establish the communication connection with the wireless power transmitter 710, using the communication module 297. The communication connection between the wireless power transmitter 710 and the wireless power receiver 720 may be a normal communication connection or an abnormal communication connection (a cross-connection).

In operation 703, according to an embodiment, the wireless power transmitter 710 may determine a frequency for power to be transmitted as a first frequency and a transmission period of the power to be transmitted as a first period. For example, the wireless power transmitter 710 may arbitrarily (or randomly) determine the frequency of the power to be transmitted. For example, the wireless power transmitter 710 may determine one of a plurality of frequencies within a first frequency range as the first frequency being the frequency of the power to be transmitted. For example, the first frequency range may be set to a range higher than the frequency of second power in operation 719 to be described later and lower than a specified frequency. For example, the wireless power transmitter 710 may determine one of a plurality of periods within a first period range as the first period being the transmission period of the power to be transmitted. For example, the first period range may be set to a range shorter than a specified period.

In operation 705, according to an embodiment, the wireless power transmitter 710 may transmit information about the frequency (e.g., the first frequency) and transmission period (e.g., the first period) determined in operation 703 to the wireless power receiver 720, using the communication module 209. The wireless power receiver 720 may receive the information about the frequency (e.g., the first frequency) and transmission period (e.g., the first period) from the wireless power transmitter 710, using the communication module 297.

In operation 707, according to an embodiment, the wireless power transmitter 710 may transmit the first power in the frequency (e.g., the first frequency) determined in operation 703 to the outside (e.g., the wireless power receiver 720 or another wireless power receiver) during the transmission period (e.g., the first period) determined in operation 703. For example, the wireless power transmitter 710 may control the power transmission circuit 211 to transmit the first power of the first frequency and/or the first magnitude. In operation 707, according to an embodiment, the wireless power receiver 720 may receive power from the outside (e.g., the wireless power transmitter 710 or another wireless power transmitter). The power received by the wireless power receiver 720 may correspond to the power (e.g., the first power) transmitted from the wireless power transmitter 710 or power transmitted from another wireless power transmitter.

In operation 709, according to an embodiment, the wireless power receiver 720 may measure the frequency (e.g., a second frequency) and reception period (e.g., a second period) of the power (e.g., the first power) received from the outside (e.g., the wireless power transmitter 710 or another wireless power transmitter). For example, the wireless power receiver 720 may identify the frequency and reception period of the received power at at least one point of the power reception circuit 291 (e.g., the output terminal of the power reception coil of the power reception circuit 291 or the output terminal of the rectifier of the power reception circuit 291).

In operation 711, according to an embodiment, the wireless power receiver 720 may determine whether it is cross-connected to the wireless power transmitter 710 (Decision 1). The wireless power receiver 720 may determine whether it is cross-connected to the wireless power transmitter 710 based on a result of a comparison between the frequency (e.g., the first frequency) included in the information received in operation 705 and the frequency (e.g., the second frequency) identified in operation 709 (Decision 1). The wireless power receiver 720 may determine whether to maintain the communication connection with the wireless power transmitter 710 based on whether it is cross-connected to the wireless power transmitter 710.

In operation 713, according to an embodiment, the wireless power receiver 720 may control the communication module 297 to release the communication connection from the wireless power transmitter 710, based on the frequency (e.g., the first frequency) included in the information received in operation 705 being different from the frequency (e.g., the second frequency) identified in operation 709.

According to an embodiment, the wireless power receiver 720 may control the communication module 297 to maintain the communication connection with the wireless power transmitter 710, based on the frequency (e.g., the first frequency) included in the information received in operation 705 being identical to the frequency (e.g., the second frequency) identified in operation 709.

In operation 715, according to an embodiment, the wireless power receiver 720 may determine whether it is cross-connected to the wireless power transmitter 710 (Decision 2). The wireless power receiver 720 may determine whether it is cross-connected to the wireless power transmitter 710, based on a result of a comparison between the transmission period (e.g., the first period) included in the information received in operation 705 and the reception period (e.g., the second period) identified in operation 709 (Decision 2). The wireless power receiver 720 may determine whether to maintain the communication connection with the wireless power transmitter 710, based on whether it is cross-connected to the wireless power transmitter 710.

In operation 717, according to an embodiment, the wireless power receiver 720 may control the communication module 297 to release the communication connection from the wireless power transmitter 710 based on the transmission period (e.g., the first period) included in the information received in operation 705 being different from the reception period (e.g., the second period) identified in operation 709.

According to an embodiment, the wireless power receiver 720 may control the communication module 297 to maintain the communication connection with the wireless power transmitter 710 based on the transmission period (e.g., the first period) included in the information received in operation 705 being identical to the reception period (e.g., the second period) identified in operation 709.

According to an embodiment, operations 711 and 715 may be sequentially performed. For example, after operation 711 is performed, operation 715 may be performed. Alternatively, after operation 715 is performed, operation 711 may be performed. According to an embodiment, operations 711 and 715 may be simultaneously performed.

In operation 719, according to an embodiment, the wireless power transmitter 710 may control the power transmission circuit 211 to transmit the second power of a magnitude (or frequency) different from the magnitude (or frequency) of the first power transmitted in operation 707 to the outside (e.g., the wireless power receiver 720 or another wireless power receiver) during a third period, based on the communication connection being maintained with the wireless power receiver 720 during the transmission of the first power (e.g., during the first period) in operation 707. For example, the third period may be fixed to a specified value. In operation 719, according to an embodiment, the wireless power receiver 720 may receive power from the outside (e.g., the wireless power transmitter 710 or another wireless power transmitter). The power received by the wireless power receiver 720 in operation 719 may correspond to the power (e.g., the second power) transmitted from the wireless power transmitter 710 or power transmitted from another wireless power transmitter. According to an embodiment, the wireless power receiver 720 may control the communication module 297 to transmit information about a load value (e.g., a first load value) related to the wireless power receiver 720 or a load range (e.g., a first load range) related to the wireless power receiver 720 to the wireless power transmitter 710 via the communication connection. For example, the load value (e.g., the first load value) related to the wireless power receiver 720 or the load range (e.g., the first load range) related to the wireless power receiver 720 may be a load value or a load range measured by the wireless power receiver 720. The wireless power transmitter 710 may control the communication module 209 to receive the information about the load value (e.g., the first load value) related to the wireless power receiver 720 or the load range (e.g., the first load range) related to the wireless power receiver 720 via the communication connection, and identify the load value (e.g., the first load value) related to the wireless power receiver 720 or the load range (e.g., the first load range) related to the wireless power receiver 720 based on the received information.

In operation 721, according to an embodiment, the wireless power transmitter 710 may determine whether it is cross-connected to the wireless power receiver 720 during the transmission period (e.g., the third period) of the power (e.g., the second power) in operation 719 (Decision 3). The wireless power transmitter 710 may determine whether it is cross-connected to the wireless power receiver 520 based on a load value (e.g., a second load value) measured through the power transmission circuit 211 during the transmission period (e.g., the third period) of the power (e.g., the second power) in operation 719. For example, the wireless power transmitter 710 may determine that it is cross-connected to the wireless power receiver 720 based on the load value (e.g., the second load value) measured through the power transmission circuit 211 during the transmission period (e.g., the third period) of the power (e.g., the second power) in operation 719 being a specified value (e.g., 0 (zero)). The wireless power transmitter 710 may determine that it is not cross-connected to the wireless power receiver 720 based on the load value (e.g., the second load value) measured through the power transmission circuit 211 during the transmission period (e.g., the third period) of the power (e.g., the second power) in the operation 719 belonging to a specified range (e.g., a range exceeding 0 (zero)). For example, the wireless power transmitter 710 may determine that it is not cross-connected to the wireless power receiver 720 based on the load value (e.g., the second load value) measured through the power transmission circuit 211 during the transmission period (e.g., the third period) of the power (e.g., the second power) in the operation 719 corresponding to the load value (e.g., the first load value) related to the wireless power receiver 720 or belonging to the load range (e.g., the first load range) related to the wireless power receiver 720. The wireless power transmitter 710 may determine that it is cross-connected to the wireless power receiver 720 based on the load value (e.g., the second load value) measured through the power transmission circuit 211 during the transmission period (e.g., the third period) of the power (e.g., the second power) in the operation 719 not corresponding to the load value (e.g., the first load value) related to the wireless power receiver 720 or not belonging to the load range (e.g., the first load range) related to the wireless power receiver 720. The wireless power transmitter 710 may determine whether to maintain the communication connection with the wireless power receiver 720 based on whether it is cross-connected to the wireless power receiver 720.

In operation 723, according to an embodiment, the wireless power transmitter 710 may control the communication module 209 to release the communication connection from the wireless power receiver 720 based on determining that the communication connection to the wireless power receiver 720 is a cross-connection in operation 721.

In operation 725, according to an embodiment, the wireless power transmitter 710 may control the communication module 209 to maintain the communication connection with the wireless power receiver 720 based on determining that the communication connection to the wireless power receiver 720 is not a cross-connection in operation 721. The wireless power transmitter 710 may enter the power tracking period (e.g., 407 of FIG. 4) based on maintaining the communication connection with the wireless power receiver 720 during the third period in operation 719.

Figure 8:
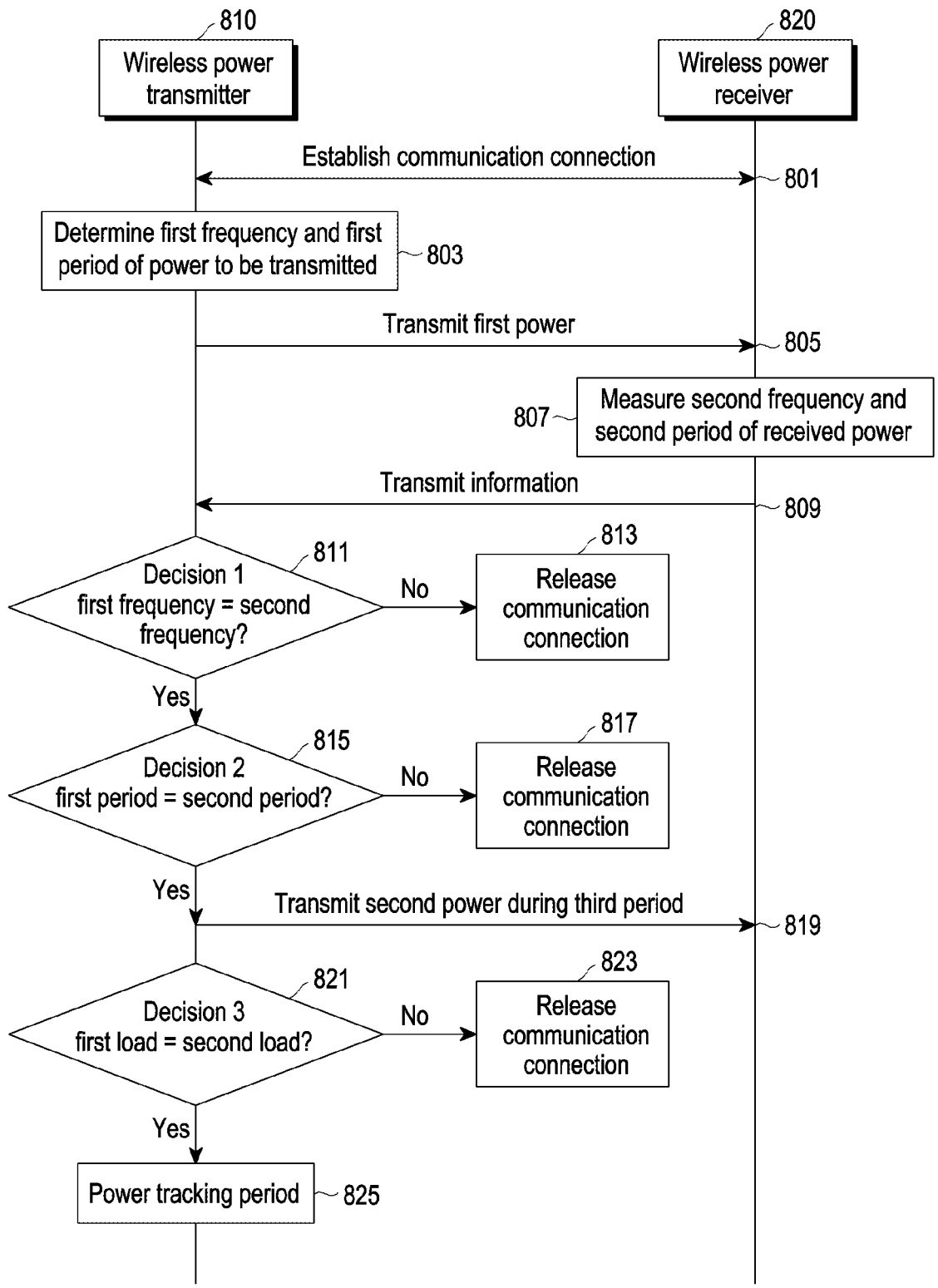
FIG. 8 is a flowchart illustrating an example method of operating a wireless power transmitter and a wireless power receiver included in a wireless power transmission system according to an embodiment.

FIG. 8 is a flowchart illustrating an example method of operating a wireless power transmitter and a wireless power receiver included in a wireless power transmission system according to an embodiment.

The description of FIG. 8 may be understood with reference to FIGS. 5 and 6.

A wireless power transmitter 810 of FIG. 8 may be the wireless power transmitter 210 of FIG. 2. A wireless power receiver 820 of FIG. 8 may be the wireless power receiver 220 of FIG. 2.

Referring to FIG. 8, in operation 801, according to an embodiment, the wireless power transmitter 810 (e.g., the processor 201) and the wireless power receiver 820 (e.g., the processor 295) may establish a communication connection. The wireless power transmitter 810 may establish the communication connection with the wireless power receiver 820, using the communication module 209. The wireless power receiver 820 may establish the communication connection with the wireless power transmitter 810, using the communication module 297. The communication connection between the wireless power transmitter 810 and the wireless power receiver 820 may be a normal communication connection or an abnormal communication connection (a cross-connection).

In operation 803, according to an embodiment, the wireless power transmitter 810 may determine a frequency for power to be transmitted as a first frequency and a transmission period of the power to be transmitted as a first period. For example, the wireless power transmitter 810 may arbitrarily (or randomly) determine the frequency of the power to be transmitted. For example, the wireless power transmitter 810 may determine one of a plurality of frequencies within a first frequency range as the first frequency being the frequency of the power to be transmitted. For example, the first frequency range may be set to a range higher than the frequency of second power in operation 819 to be described later and lower than a specified frequency. For example, the wireless power transmitter 810 may determine one of a plurality of periods within a first period range as the first period being the transmission period of the power to be transmitted. For example, the first period range may be set to a range shorter than a specified period.

In operation 805, according to an embodiment, the wireless power transmitter 810 may transmit the first power in the frequency (e.g., the first frequency) determined in operation 803 to the outside (e.g., the wireless power receiver 820 or another wireless power receiver) during the transmission period (e.g., the first period) determined in operation 803. For example, the wireless power transmitter 810 may control the power transmission circuit 211 to transmit the first power of the first frequency and/or the first magnitude. In operation 805, according to an embodiment, the wireless power receiver 820 may receive power from the outside (e.g., the wireless power transmitter 810 or another wireless power transmitter). The power received by the wireless power receiver 820 may correspond to the power (e.g., the first power) transmitted from the wireless power transmitter 810 or power transmitted from another wireless power transmitter.

In operation 807, according to an embodiment, the wireless power receiver 820 may measure the frequency (e.g., a second frequency) and reception period (e.g., a second period) of the power (e.g., the first power) received from the outside (e.g., the wireless power transmitter 810 or another wireless power transmitter). For example, the wireless power receiver 820 may identify the frequency and reception period of the received power at at least one point of the power reception circuit 291 (e.g., the output terminal of the power reception coil of the power reception circuit 291 or the output terminal of the rectifier of the power reception circuit 291).

In operation 809, according to an embodiment, the wireless power receiver 820 may transmit information about the frequency (e.g., the second frequency) and reception period (e.g., the second period) identified in operation 807 to the wireless power transmitter 810, using the communication module 297. The wireless power transmitter 810 may receive information about the frequency (e.g., the second frequency) and reception period (e.g., the second period) identified in operation 807 from the wireless power receiver 820, using the communication module 209.

In operation 811, according to an embodiment, the wireless power transmitter 810 may determine whether it is cross-connected to the wireless power receiver 820 (Decision 1). The wireless power transmitter 810 may determine whether it is cross-connected to the wireless power receiver 820 based on a result of a comparison between the frequency (e.g., the second frequency) included in the information received in operation 809 and the frequency (e.g., the first frequency) determined in operation 803 (Decision 1). The wireless power transmitter 810 may determine whether to maintain the communication connection with the wireless power receiver 820 based on whether it is cross-connected to the wireless power receiver 820.

In operation 813, according to an embodiment, the wireless power transmitter 810 may control the communication module 209 to release the communication connection from the wireless power receiver 820, based on the frequency (e.g., the second frequency) included in the information received in operation 809 being different from the frequency (e.g., the first frequency) determined in operation 803.

According to an embodiment, the wireless power transmitter 810 may control the communication module 209 to maintain the communication connection with the wireless power receiver 820, based on the frequency (e.g., the second frequency) included in the information received in operation 809 being identical to the frequency (e.g., the first frequency) determined in operation 803, In operation 815, according to an embodiment, the wireless power transmitter 810 may determine whether it is cross-connected to the wireless power receiver 820 (Decision 2). The wireless power transmitter 810 may determine whether it is cross-connected to the wireless power receiver 820, based on a result of a comparison between the reception period (e.g., the second period) included in the information received in operation 809 and the transmission period (e.g., the first period) determined in operation 803 (Decision 2). The wireless power transmitter 810 may determine whether to maintain the communication connection with the wireless power receiver 820, based on whether it is cross-connected to the wireless power receiver 820.

In operation 817, according to an embodiment, the wireless power transmitter 810 may control the communication module 209 to release the communication connection from the wireless power receiver 820 based on the reception period (e.g., the second period) included in the information received in operation 809 being different from the transmission period (e.g., the first period) determined in operation 803.

According to an embodiment, the wireless power transmitter 810 may control the communication module 209 to maintain the communication connection with the wireless power receiver 820 based on the reception period (e.g., the second period) included in the information received in operation 809 being identical to the transmission period (e.g., the first period) determined in operation 803.

According to an embodiment, operations 811 and 815 may be sequentially performed. For example, after operation 811 is performed, operation 815 may be performed. Alternatively, after operation 815 is performed, operation 811 may be performed. According to an embodiment, operations 811 and 815 may be simultaneously performed.

In operation 819, according to an embodiment, the wireless power transmitter 810 may control the power transmission circuit 211 to transmit second power of a magnitude (or frequency) different from the magnitude (or frequency) of the first power transmitted in operation 805 to the outside (e.g., the wireless power receiver 820 or another wireless power receiver) during a third period, based on the communication connection being maintained with the wireless power receiver 820. For example, the third period may be fixed to a specified value. In operation 819, according to an embodiment, the wireless power receiver 820 may receive power from the outside (e.g., the wireless power transmitter 810 or another wireless power transmitter). The power received by the wireless power receiver 820 in operation 819 may correspond to the power (e.g., the second power) transmitted from the wireless power transmitter 810 or power transmitted from another wireless power transmitter. According to an embodiment, the wireless power receiver 820 may control the communication module 297 to transmit information about a load value (e.g., a first load value) related to the wireless power receiver 820 or a load range (e.g., a first load range) related to the wireless power receiver 820 to the wireless power transmitter 810 via the communication connection. For example, the load value (e.g., the first load value) related to the wireless power receiver 820 or the load range (e.g., the first load range) related to the wireless power receiver 820 may be a load value or a load range measured by the wireless power receiver 820. The wireless power transmitter 810 may control the communication module 209 to receive the information about the load value (e.g., the first load value) related to the wireless power receiver 820 or the load range (e.g., the first load range) related to the wireless power receiver 820 via the communication connection, and identify the load value (e.g., the first load value) related to the wireless power receiver 820 or the load range (e.g., the first load range) related to the wireless power receiver 820 based on the received information.

Operation 821 may be understood by referring to operation 721.

Operation 823 may be understood by referring to operation 723.

Operation 825 may be understood by referring to operation 725.

According to an example embodiment, a wireless power transmitter (e.g., the wireless power transmitter 210) may include: a communication module comprising communication circuitry (e.g., the communication module 209); a power transmission circuit (e.g., the power transmission circuit 211) configured to transmit wireless power; and a processor (e.g., the processor 201). The processor may be configured to: establish a communication connection with a wireless power receiver (e.g., the wireless power receiver 220), using the communication module, control the communication module to transmit information about a first period to the wireless power receiver via the communication connection, control the power transmission circuit to transmit first power of a first frequency and a first magnitude to an outside, control the communication module to receive, from the wireless power receiver via the communication connection, information about a second frequency of second power received at the wireless power receiver, control the communication module to release the communication connection based on the first frequency being different from the second frequency, and control the power transmission circuit to transmit third power of a magnitude different from the first magnitude of the first power to the outside during the first period based on the first frequency being identical to the second frequency.

According to an example embodiment, the processor may be configured to, based on the first frequency being identical to the second frequency, control the power transmission circuit to transmit the third power by adjusting the third power to have a third frequency different from the first frequency of the first power.

According to an example embodiment, the third frequency may be lower than the first frequency.

According to an example embodiment, the processor may be configured to determine one of a plurality of frequencies within a first frequency range as the first frequency.

According to an example embodiment, the first frequency range may be set to a range higher than the third frequency and lower than a specified frequency.

According to an example embodiment, the processor may be configured to determine one of a plurality of periods within a first period range as the first period.

According to an example embodiment, the first period range may be set to a range shorter than a specified period.

According to an example embodiment, the processor may be configured to control the power transmission circuit to transmit fourth power during a second period after transmitting the third power during the first period.

According to an example embodiment, the second period may be fixed to a specified value.

According to an example embodiment, the processor may be configured to, based on the communication connection not being released during the first period during which the third power is transmitted, control the power transmission circuit to transmit the fourth power during the second period.

According to an example embodiment, the processor may be configured to determine whether to maintain the communication connection based on a load measured through the power transmission circuit while transmitting the fourth power.

According to an example embodiment, the processor may be configured to determine to maintain the communication connection based on the measured load being within a specified range.

According to an example embodiment, the processor may be configured to: control the communication module to receive, from the wireless power receiver via the communication connection, information about a first load value related to the wireless power receiver or a first load range related to the wireless power receiver, and determine to maintain the communication connection based on the measured load corresponding to the first load value or the measured load being within the first load range.

According to an example embodiment, a method of operating a wireless power transmitter (e.g., the wireless power transmitter 210) may include: establishing a communication connection with a wireless power receiver (e.g., the wireless power receiver 220), using a communication module comprising communication circuitry (e.g., the communication module 209) of the wireless power transmitter; transmitting information about a first period to the wireless power receiver via the communication connection; transmitting first power of a first frequency and a first magnitude to an outside through a power transmission circuit (e.g., the power transmission circuit 211) of the wireless power transmitter; receiving, from the wireless power receiver via the communication connection, information about a second frequency of second power received at the wireless power receiver; based on the first frequency being different from the second frequency, releasing the communication connection; and based on the first frequency being identical to the second frequency, transmitting third power of a magnitude different from the first magnitude of the first power to the outside during the first period through the power transmission circuit.

According to an example embodiment, transmitting the third power to the outside during the first period may include transmitting the third power by adjusting the third power to have a third frequency different from the first frequency of the first power.

According to an example embodiment, the method may further include determining one of a plurality of frequencies within a first frequency range as the first frequency.

According to an example embodiment, the first frequency range may be set to a range higher than the third frequency and lower than a specified frequency.

According to an example embodiment, the method may further include determining one of a plurality of periods within a first period range as the first period.

According to an example embodiment, the method may further include: based on the communication connection not being released during the first period during which the third power is transmitted, transmitting the fourth power during the second period through the power transmission circuit; and determining whether to maintain the communication connection based on a load measured through the power transmission circuit while transmitting the fourth power.

According to an example embodiment, a wireless power receiver (e.g., the wireless power receiver 220) may include: a communication module comprising communication circuitry (e.g., the communication module 297); a power reception circuit (e.g., the power reception circuit 291) configured to receive wireless power; and a processor (e.g., the processor 295). The processor may be configured to: establish a communication connection with a wireless power transmitter (e.g., the wireless power transmitter 210), using the communication module, control the communication module to receive information about a first period from the wireless power transmitter via the communication connection, identify a first frequency and a first magnitude of first power identified at at least one point of the power reception circuit, control the communication module to transmit information about the first frequency of the first power to the wireless power transmitter via the communication connection, identify a second magnitude of second power identified at the at least one point of the power reception circuit, the second magnitude being different from the first magnitude of the first power, identify a second period during which the second power is received, control the communication module to release the communication connection based on the first period being different from the second period, and control the communication module to maintain the communication connection, based on the first period being identical to the second period.

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C", may include any one of, or all possible combinations of the items enumerated together in a corresponding one of the phrases. As used herein, such terms as "1st" and "2nd", or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used in connection with various embodiments of the disclosure, the term "module" may include a unit implemented in hardware, software, or firmware, or any combination thereof, and may interchangeably be used with other terms, for example, logic, logic block, part, or circuitry. A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., a program) including one or more instructions that are stored in a storage medium (e.g., internal memory or external memory) that is readable by a machine (e.g., the wireless power transmitter 100). For example, a processor (e.g., the processor 201) of the machine (e.g., the wireless power transmitter 100) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. A wireless power transmitter comprising:
    a communication module comprising communication circuitry;
    a power transmission circuit configured to transmit wireless power; and
    a processor,
    wherein the processor is configured to:
    establish a communication connection with a wireless power receiver using the communication module,
    control the communication module to transmit information about a first period to the wireless power receiver via the communication connection,
    control the power transmission circuit to transmit first power of a first frequency and a first magnitude to an outside,
    control the communication module to receive, from the wireless power receiver via the communication connection, information about a second frequency of second power received at the wireless power receiver,
    based on the first frequency being different from the second frequency, control the communication module to release the communication connection, and
    based on the first frequency corresponding to the second frequency, control the power transmission circuit to transmit third power of a magnitude different from the first magnitude of the first power to the outside during the first period.

2. The wireless power transmitter of claim 1, wherein the processor is configured to, based on the first frequency corresponding to the second frequency, control the power transmission circuit to transmit the third power by adjusting the third power to have a third frequency different from the first frequency of the first power.

3. The wireless power transmitter of claim 2, wherein the third frequency is lower than the first frequency.

4. The wireless power transmitter of claim 2, wherein the processor is configured to determine one of a plurality of frequencies within a first frequency range as the first frequency.

5. The wireless power transmitter of claim 4, wherein the first frequency range is set to a range higher than the third frequency and lower than a specified frequency.

6. The wireless power transmitter of claim 1, wherein the processor is configured to determine one of a plurality of periods within a first period range as the first period.

7. The wireless power transmitter of claim 6, wherein the first period range is set to a range shorter than a specified period.

8. The wireless power transmitter of claim 1, wherein the processor is configured to control the power transmission circuit to transmit fourth power during a second period after transmitting the third power during the first period.

9. The wireless power transmitter of claim 8, wherein the second period is fixed to a specified value.

10. The wireless power transmitter of claim 8, wherein the processor is configured to, based on the communication connection not being released during the first period during which the third power is transmitted, control the power transmission circuit to transmit the fourth power during the second period.

11. The wireless power transmitter of claim 8, wherein the processor is configured to determine whether to maintain the communication connection based on a load measured through the power transmission circuit while transmitting the fourth power.

12. The wireless power transmitter of claim 11, wherein the processor is configured to determine to maintain the communication connection based on the measured load being within a specified range.

13. The wireless power transmitter of claim 11, wherein the processor is configured to:
    control the communication module to receive, from the wireless power receiver via the communication connection, information about a first load value related to the wireless power receiver or a first load range related to the wireless power receiver, and
    determine to maintain the communication connection based on the measured load corresponding to the first load value or the measured load being within the first load range.

14. A method of operating a wireless power transmitter, the method comprising:
    establishing a communication connection with a wireless power receiver, using a communication module of the wireless power transmitter;
    transmitting information about a first period to the wireless power receiver via the communication connection;
    transmitting first power of a first frequency and a first magnitude to an outside through a power transmission circuit of the wireless power transmitter;
    receiving, from the wireless power receiver via the communication connection, information about a second frequency of second power received at the wireless power receiver;

based on the first frequency being different from the second frequency, releasing the communication connection; and based on the first frequency corresponding to the second frequency, transmitting third power of a magnitude different from the first magnitude of the first power to the outside during the first period through the power transmission circuit.

15. The method of claim 14, wherein transmitting the third power to the outside during the first period comprises transmitting the third power by adjusting the third power to have a third frequency different from the first frequency of the first power.

16. The method of claim 14, further comprising determining one of a plurality of frequencies within a first frequency range as the first frequency.

17. The method of claim 16, wherein the first frequency range is set to a range higher than the third frequency and lower than a specified frequency.

18. The method of claim 14, further comprising determining one of a plurality of periods within a first period range as the first period.

19. The method of claim 14, further comprising:

based on the communication connection not being released during the first period during which the third power is transmitted, transmitting the fourth power during the second period through the power transmission circuit; and determining whether to maintain the communication connection based on a load measured through the power transmission circuit while transmitting the fourth power.

20. A wireless power receiver comprising:

a communication module comprising communication circuitry;

a power reception circuit configured to receive wireless power; and a processor, wherein the processor is configured to:

establish a communication connection with a wireless power transmitter using the communication module, control the communication module to receive information about a first period from the wireless power transmitter via the communication connection, identify a first frequency and a first magnitude of first power identified at at least one point of the power reception circuit, control the communication module to transmit information about the first frequency of the first power to the wireless power transmitter via the communication connection, identify a second magnitude of second power identified at the at least one point of the power reception circuit, the second magnitude being different from the first magnitude of the first power, identify a second period during which the second power is received, based on the first period being different from the second period, control the communication module to release the communication connection, and based on the first period being substantially identical to the second period, control the communication module to maintain the communication connection.

* * * * *